United States Patent [19]
Parrett

[11] Patent Number: 5,586,271
[45] Date of Patent: Dec. 17, 1996

[54] IN-LINE SCSI BUS CIRCUIT FOR PROVIDING ISOLATION AND BI-DIRECTIONAL COMMUNICATION BETWEEN TWO PORTIONS OF A SCSI BUS

[75] Inventor: George Parrett, Trabuco Canyon, Calif.

[73] Assignee: Macrolink Inc., Anaheim, Calif.

[21] Appl. No.: 313,434

[22] Filed: Sep. 27, 1994

[51] Int. Cl.$^6$ .............................. G06F 13/00; H04B 1/38
[52] U.S. Cl. ............................ 395/283; 326/86; 326/90; 375/219; 370/463
[58] Field of Search .................................. 395/282, 283

[56] References Cited

U.S. PATENT DOCUMENTS

| | | | |
|---|---|---|---|
| 4,475,191 | 10/1984 | James et al. | 370/85 |
| 4,490,785 | 12/1984 | Strecker et al. | 395/325 |
| 4,577,327 | 3/1986 | Nambu | 375/4 |
| 4,590,552 | 5/1986 | Guttag et al. | 395/425 |
| 4,713,779 | 12/1987 | Graciotti et al. | 395/500 |
| 4,739,253 | 4/1988 | Everhart et al. | 364/487 |
| 4,949,334 | 8/1990 | Bernhardt | 370/55 |
| 5,118,970 | 6/1992 | Olson et al. | 307/443 |
| 5,157,771 | 10/1992 | Losi et al. | 395/325 |
| 5,247,619 | 9/1993 | Mutoh et al. | 395/325 |
| 5,274,769 | 12/1993 | Ishida | 395/275 |
| 5,287,464 | 2/1994 | Kumar et al. | 395/325 |
| 5,297,067 | 3/1994 | Blackboron et al. | 395/325 |
| 5,386,548 | 1/1995 | Nguyen et al. | 395/425 |
| 5,469,473 | 11/1995 | McClear et al. | 375/219 |

*Primary Examiner*—Jack B. Harvey
*Assistant Examiner*—Sumati Lefkowitz

[57] ABSTRACT

An in-line SCSI bus isolation circuit includes two ports for transparently communicating bidirectional data and controls signals therebetween during normal operation using respective dedicated sets of line drivers which may be data bit-by-bit and control signal-by-signal selectively enabled and disabled to permit the bidirectional transparent SCSI communications, and which may be completely disabled to electrically isolate a connected SCSI device on a first SCSI port from the other remaining connected SCSI components on the second SCSI port, so that that device may be removed or inserted onto the SCSI bus at the first port when the line drivers are disabled to prevent the voltage transient signals generated on the first SCSI port from being propagated to the second SCSI port connected to the other SCSI components prior to enabling the line drivers and bidirectional SCSI communications between the two SCSI ports.

18 Claims, 9 Drawing Sheets

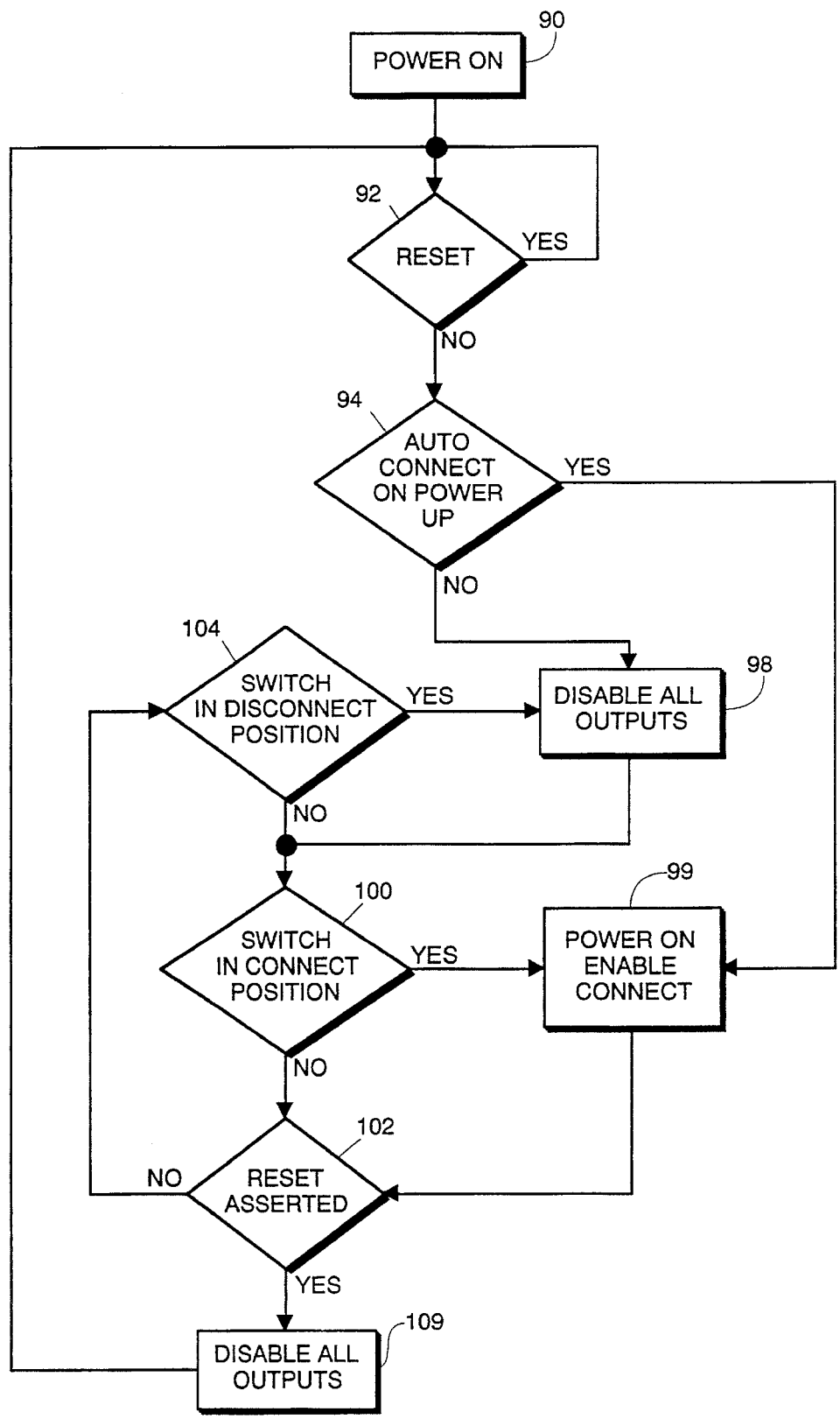
FIG. 4a CONNECT CONTROL SEQUENCE

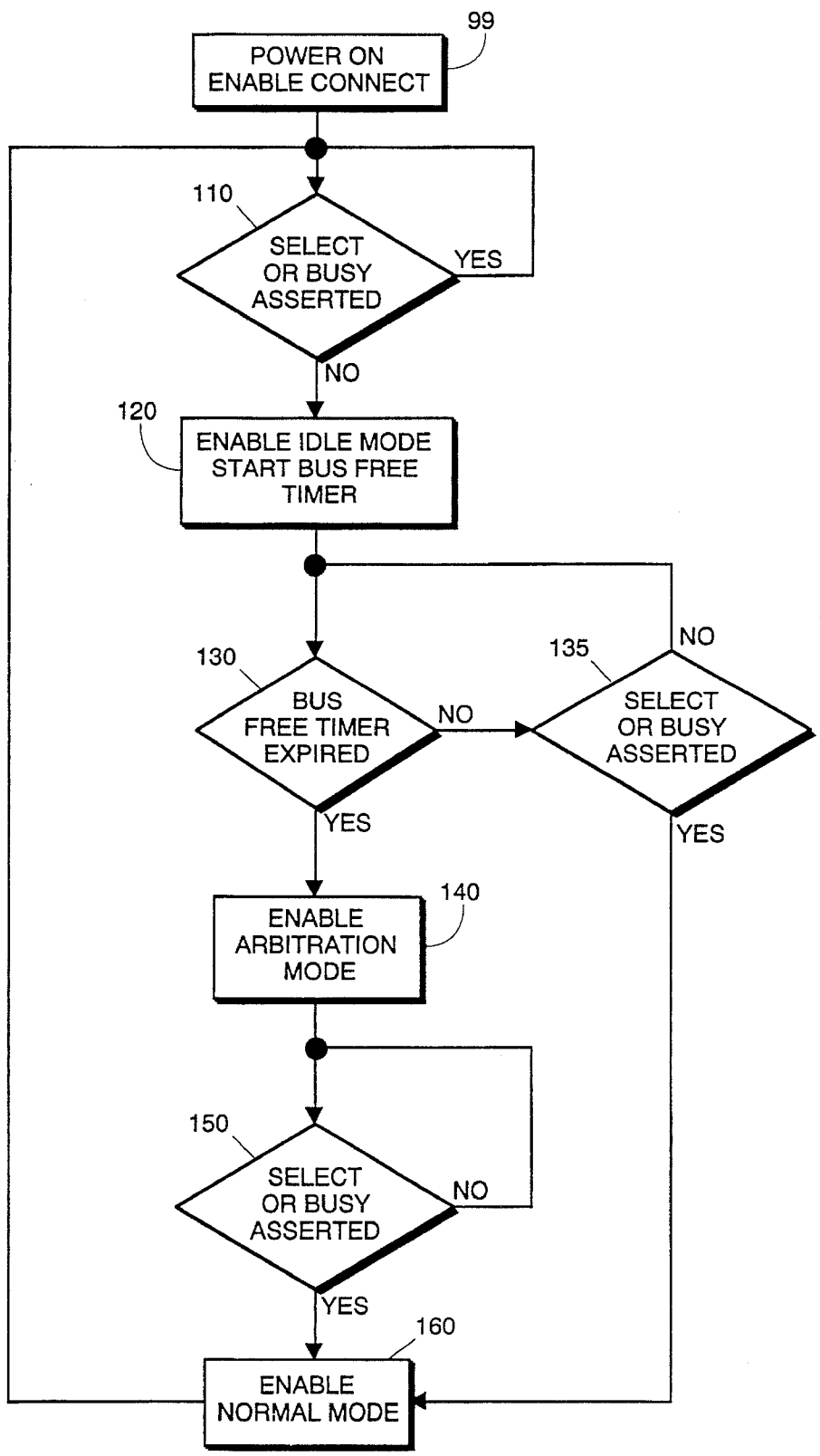
FIG. 4b MASTER SEQUENCER

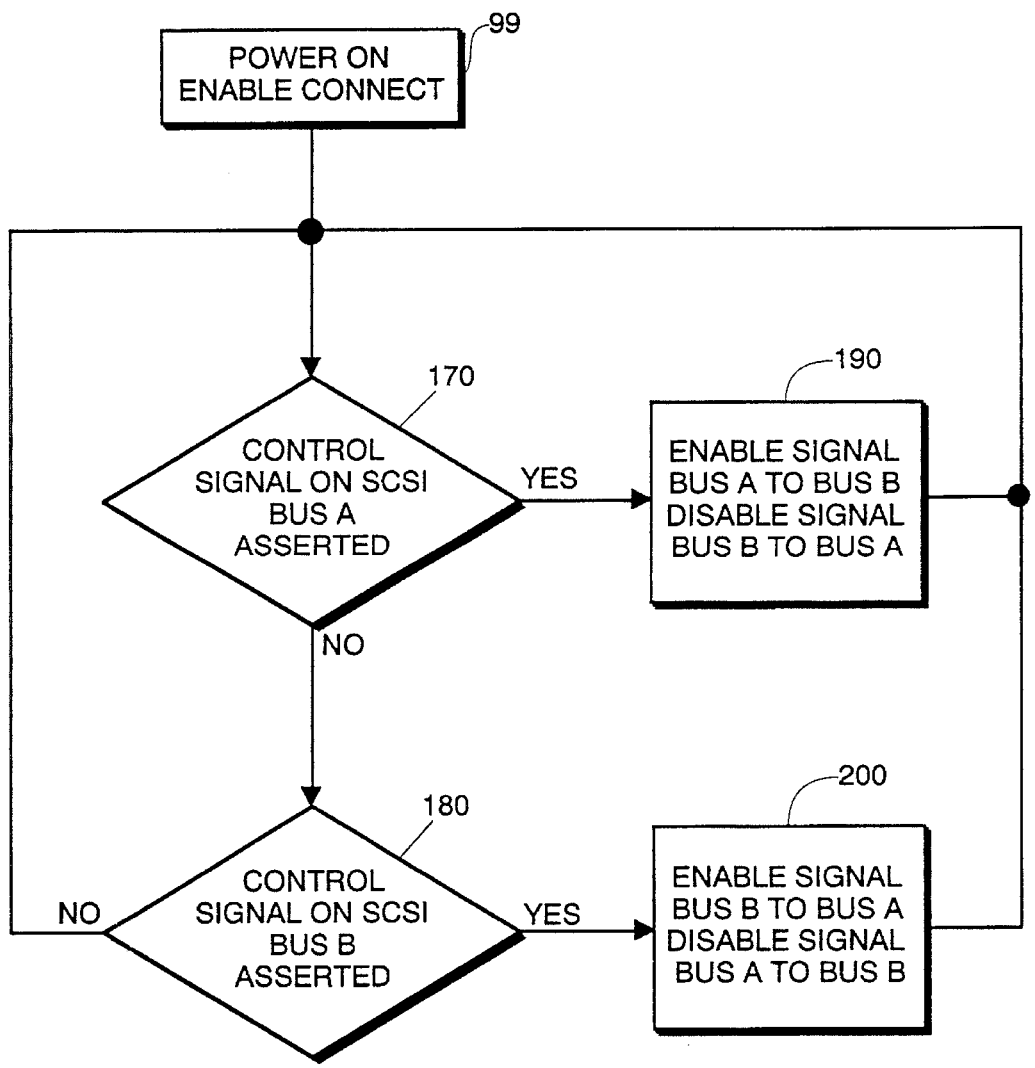
FIG. 4c CONTROL SEQUENCER

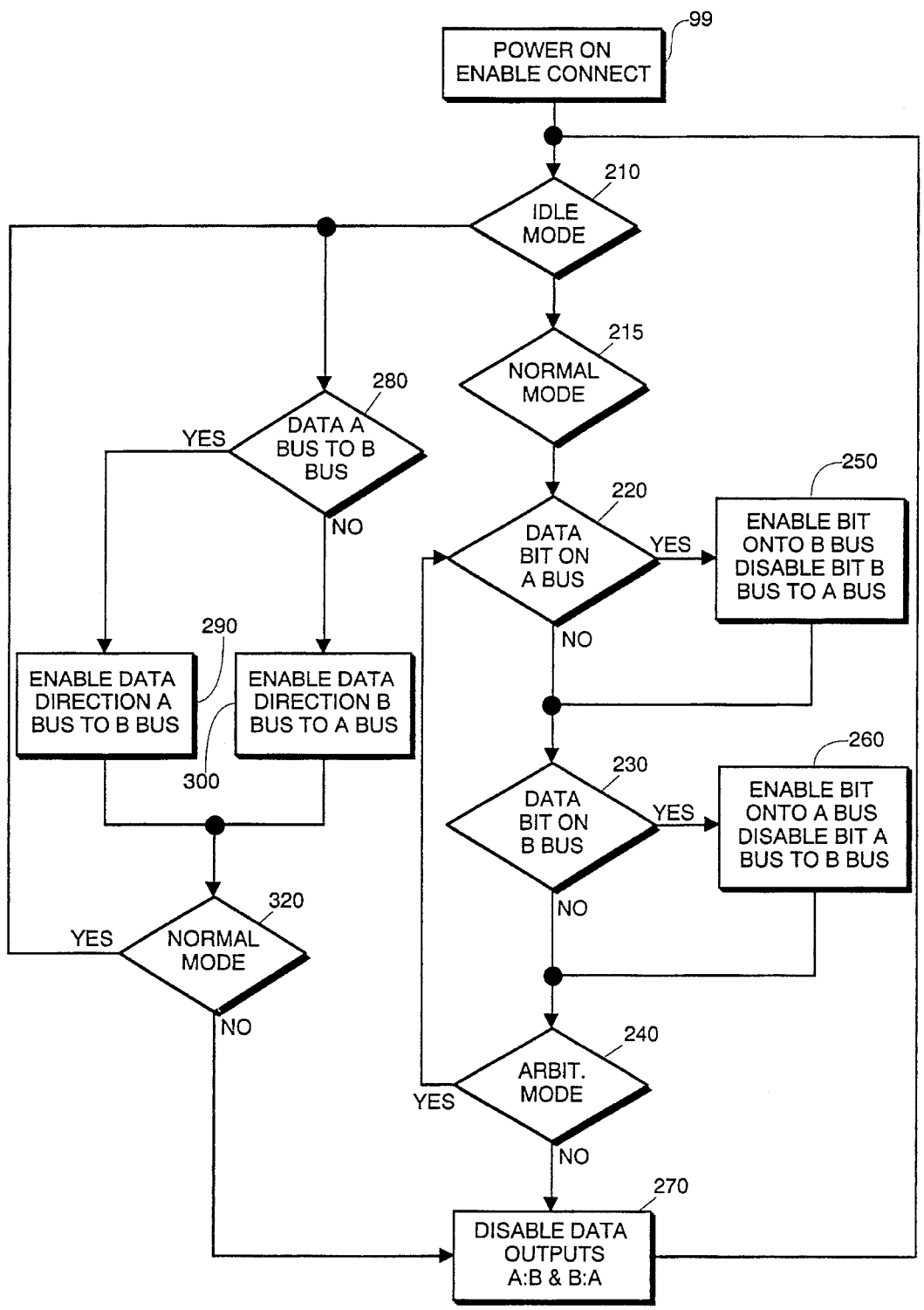
FIG. 4d  DATA SEQUENCER

5,586,271

IN-LINE SCSI BUS CIRCUIT FOR PROVIDING ISOLATION AND BI-DIRECTIONAL COMMUNICATION BETWEEN TWO PORTIONS OF A SCSI BUS

FIELD OF THE INVENTION

The present invention relates to computer systems and computer bus interconnections between computer system components. More particularly, the present invention relates to the connection and disconnection of devices to a computer bus, more specifically, a computer SCSI bus and devices which enable the insertion or removal of computer type devices onto the computer SCSI bus suppressing the creation of noise transients, power spikes and like computer system failure creating events.

BACKGROUND OF THE INVENTION

Computer devices, such as hard magnetic disk drives have long been used in computer systems for mass storage purposes and are typically the main storage facility having fast random access to stored data. One disadvantage of the hard disk drive is that the disks are fixed in the drive and can not be easily transported to other locations. In the computer environment, it is desirable to insert and remove hard disk drives from their respective computer bus attachments such as a SCSI bus connection. However, when removing or inserting a disk drive onto a computer bus, care must be taken not cause electrical transient signals which may damage other connected components which may otherwise experience a processing failure. It is further advantageous to be able to insert or remove connected devices while the connected computer is active and powered up processing various tasks. Thus, various means have been employed to disconnect (hot removal) and reconnect (hot insertion) peripheral devices from or to data buses connected to and communicating data to and from connected powered up host computer systems.

In Bartol, U.S. Pat. No. 5,210,855, devices to be hot inserted or hot removed are connected through connecting pins mechanically arranged to ensure that connections are made in a particular order, such as ground lines, then power lines, then data lines. These mechanical pin arrangements are subject to failure based upon the;direction of insertion, and do not provide the accuracy and reliability of electrically controlled connections and disconnections.

In Losi, U.S. Pat. No. 5,157,771, an apparatus is disclosed for hot removal or hot insertion of system components, the apparatus including electronic switching means and line biasing circuitry for deenergizing or energizing line switches to reduce the amount of noise introduced. However, noise may still be induced and not completely eliminated.

In Mutoh, U.S. Pat. No. 5,247,619 a system is disclosed wherein circuits boards may be inserted or removed while the system is in operation. As a component is added or removed, the device control circuitry sends a signal to the bus controller requesting that all devices connected to the bus stop sending signals along the bus until the insertion or removal is complete and the bus is again stable. This system disadvantageously requires special signaling to and processing by the other connected devices to essentially ignore the bus conditions during insertion and removal rather than eliminating the transients in the first instance.

In Herrig, U.S. Pat. No. 4,835,737 a system is disclosed for hot insertion and hot removal by the suspension of a clocking signal on the bus. This method does not eliminate the generation of transients, but rather disables connected devices.

The above references, Bartol, Losi, Mutoh and Herrig do not specifically relate to a SCSI bus and the problem of disk drive insertion and removal thereon. These prior arrangements may cause transient on the SCSI lines to occur because the bus lines are not completely isolated during hot insertion or hot removal.

Blackborow, U.S. Pat. No. 5,210,855 relates to isolation of the SCSI bus during hot insertion and hot removal of connected disk drives. Blackborow, discloses a SCSI bus base unit including an interface circuit and a disk drive module. The base unit connects to the SCSI bus through to an adaptor which in turn connects the SCSI bus to a host computer. The system uses a special control status bus which connects between the base unit and the disk module. The base unit includes a SCSI interface circuit and a microcontroller CPU. Blackborow shows a microprocessor controlled interface using special control lines. Significantly, the SCSI bus to the host computer is not completely isolated from transients caused by the insertion or removal of a disk module by virtue of the direct SCSI bus connection between the disk drive module and host computer. The system in Blackborow disadvantageously teaches the direct SCSI bus connection between the host computer and the hot inserted or hot removed disk drive thereby subjecting the host computer and other external disk drives to transients caused by the hot insertion and hot removal of the disk drive module.

Prior computer bus isolation devices disclose the use pin arrangements, special control lines and or switching mechanisms all used to minimize the effect of voltage transients produced by the hot insertion or hot removal of peripheral devices. Consequently, the prior computer bus isolation devices do not eliminate voltage transient during hot insertion or hot removal, but rather attempt to minimize the strength of those transients or to minimize the effect caused by those transients subjecting the connected host computer and the connected devices to transient voltage signals, rather than assuredly completely eliminating the voltage transients. These and other disadvantages are solved and reduced by the present invention.

SUMMARY OF THE INVENTION

An object of the present invention is to reduce transient voltage signals generated during the hot insertion or hot removal of devices on a computer bus, Another object of the present invention is to eliminate transient voltage signals generated during the hot insertion or hot removal of devices on a computer bus.

Yet another object of the present invention is to eliminate transient voltage signals generated during the hot insertion or hot removal of host computers or disk drives connected to a computer SCSI bus, Still another object of the present invention is to eliminate transient voltage signals generated on a computer bus during the hot insertion or hot removal of a computer device using a bidirectional communication isolation device connected to and becoming part of the computer bus and connected between a computer device and the remainder of the computer devices connected on the computer bus, Still a further object of the present invention is to eliminate transient voltage signals generated on a computer SCSI bus during the hot insertion or hot removal of a host computer or a disk drive using a bidirectional communication isolation device having two SCSI ports for connecting to and becoming part of the SCSI computer bus, and connected between the various computer devices such as a host computer or a disk drive by disabling line drivers of the two SCSI ports when a connected computer device is being hot removed or hot inserted.

The present invention covers a circuit apparatus connected within a computer bus, e.g. a SCSI computer bus, commonly used to communicate data between a computer a peripheral device, such as a hard disk drive. The apparatus is a bidirectional transparent communication device positioned in-line within the SCSI bus having two identical ports, an A port and a B port, and repeats the SCSI signals of both ports in both directions. This device allows for the enabling electrical connection during normal operation or disabling electrical disconnection during isolation, so that a connected device can be electrically isolated and removed from or inserted onto one SCSI bus port without generating transient signals at the other SCSI bus port. The apparatus functions to disable the line driver outputs, which are typically open collector type pull up outputs on the two ports, prior to the removal or insertion of a device on one of the ports. The inserted or removed device can be electrically connected or electrically disconnected from the bus, so that the remaining connected devices are isolated and may continue communication without interruption and without being subject to transient signals during the insertion or removal of the inserted or removed device. The invention covers a SCSI computer bus isolation circuit, which in the preferred form, is a sequencer and hardwired logic electrically disconnecting and electrically connecting circuit disposed in-line within the SCSI bus between devices such as central processors, host computers, disk drives and other peripherals. A disk drive or CPU may be removed and another inserted without having to power down the entire system and without causing voltage transients or spikes on a hot portion of the SCSI bus. The transients may cause undetermined failures of the system on the hot portion of the SCSI bus communicating data which may be corrupted by those transients. The isolation circuit isolates a device from the SCSI bus during power cycling, that is, when removing or inserting the device on the bus or when applying or removing power to the device. The SCSI bus in-line isolation circuit has two SCSI ports. All SCSI bus signals sensed on one port of the SCSI bus are regenerated on the other port so that the isolation circuit appears transparent on the SCSI bus during normal operation. The isolation circuit include means to disable line drivers of both ports to prevent the regeneration of transients during power cycling to isolate the hot SCSI bus portion connected to the remaining devices from possible voltage transients.

The isolation circuit in one form of the invention, uses an external connect disconnect switch, or in another form, a special input control connect disconnect signal, to remotely electrically disconnect or electrically connect the two ports on the SCSI bus by enabling or disabling SCSI bus line drivers. Thus, the isolation circuit has SCSI bus line drivers which are disabled during power cycling, when a device is removed from or inserted onto the SCSI bus, or during the application or removal of power. The line drivers are re-enabled to transmit valid signals only after the inserted device has been powered up and the device SCSI signals of the device are stable and valid. The line drivers are always properly disabled or enabled so that there is no change in the loading on the SCSI bus which might otherwise cause transients on the remaining hot portion of the SCSI bus during the removal or insertion of a device.

The present invention significantly advances the art by the use on a dual-ported in-line data bus isolation circuit which provides bidirectional transparent bus communication during normal operation, and which provides complete electrical isolation of attached computer components connected to one port during the hot insertion or hot removal of a device on the other port thereby completely protecting the attached computer components from transient voltage signals caused by the removal or insertion of that device. These and other advantages will become more apparent in the following detailed description of the preferred embodiment.

BRIEF DESCRIPTION OF THE DRAWINGS

FIG. 4a is a flow diagram of a hardwired logic connect control sequence.

FIG. 4b is a flow diagram of a master sequencer.

FIG. 4c is a flow diagram of a control sequencer.

FIG. 4d is a flow diagram of a data sequencer.

DETAILED DESCRIPTION OF THE PREFERRED EMBODIMENT

Figure 1A:
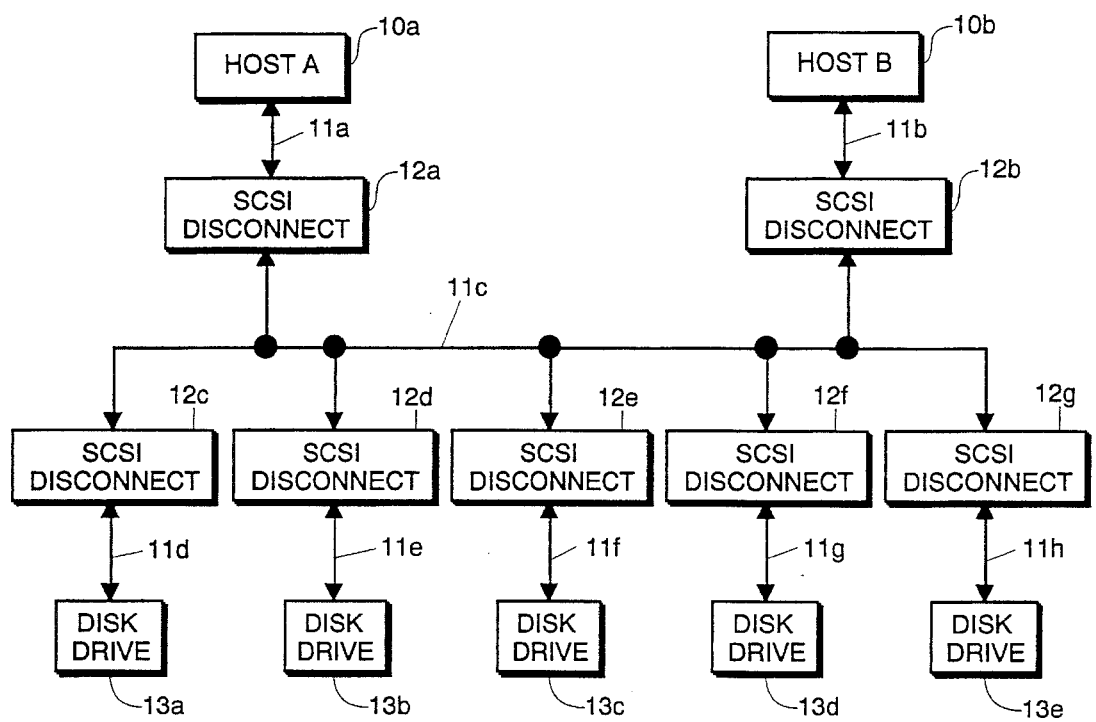
FIG. 1a is a block diagram of a dual host computer system configuration using single ended lines for communication through in-line SCSI isolation disconnect circuits.

Referring to FIG. 1a, two hosts computers 10a and 10b, are shown in one form of the invention respectively connected through two buses 11a and 11b, preferably SCSI buses, to two isolation disconnect circuits 12a and 12b, both of which are in turn connected to a bus 11c, which is in turn connected to additional isolation disconnect circuits 12c, 12d, 12e, 12f and 12g, which are in turn connected to peripheral devices, shown in the preferred form as a plurality of disk drives, 13a, 13b, 13c, 13d and 13e, respectively, through buses 11d, 11e, 11f, 11g and 11h, respectively, which are also preferably SCSI buses. This exemplar system uses at least one in-line isolation disconnect circuit 12 to interconnect together at least one host computer 10 and at least one peripheral device 13. The system preferably has one in-line isolation circuit 12 for each host 10 and each peripheral 13. A variety of combinations of isolation disconnect circuits 12, hosts 10 and peripherals 13 may be used to perfect transient free hot insertion or hot removal of a host 10 or a peripheral 13. During normal operation, the isolation circuits 12 appears transparent to the hosts 10 and peripherals 13 and are used to interconnect portions of the bus 11 functioning as a single integrated interconnecting data bus. Thus, each circuit 12 is connected to two separate portions of the bus 11. For example, isolation circuit 12a is connected to bus portion 11a and bus portion 11c. The isolation circuit 12 preferably uses well known single ended pull up high and active low output formats.

In the preferred form, the in-line isolation disconnect circuits 12 connect to standard SCSI bus portions 11 using standard SCSI connectors, not shown. Standard SCSI connectors are well known connectors in the art of interface bus design and configurations. The preferred single ended format of the SCSI bus 11 has a limited specification cable length, and is not well suited for remotely connecting a host computer 10 distal from the peripheral devices 13.

Figure 1B:
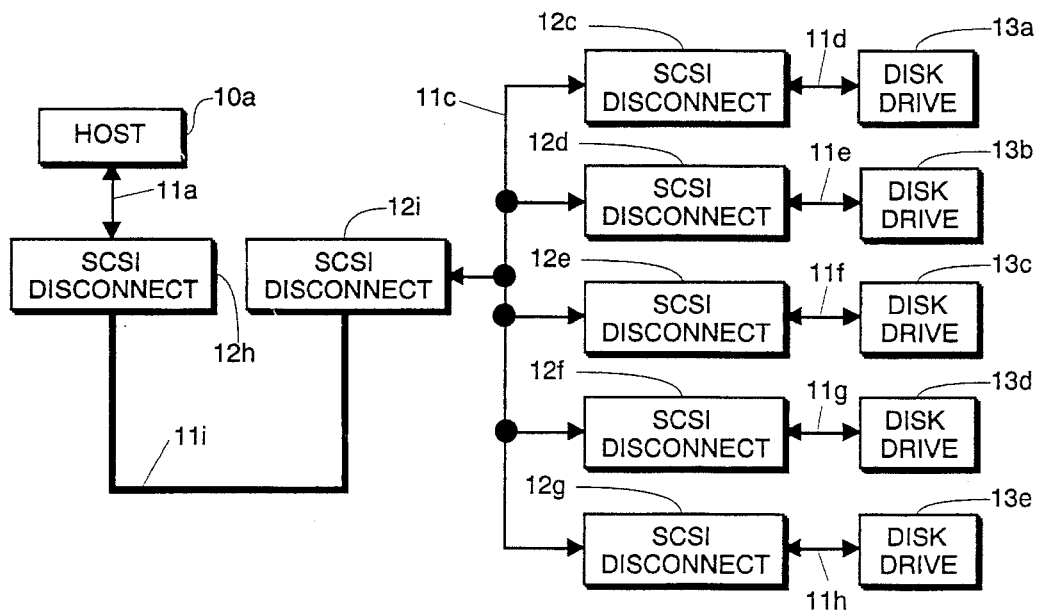
FIG. 1b is a block diagram of a single host computer system configuration using differential lines between two in-line SCSI isolation disconnect circuits.

Referring to FIG. 1b, in another preferred form of the invention, isolation disconnect circuits 12h and 12i respectively connect together single ended SCSI bus 11a and 11c to differential bus 11i, as shown. The paired differential bus 11i typically provides for communication over longer cable distances. The differential bus 11i can transmit signals a greater distance than, for example, the single ended bus 11a. Thus, the isolation circuits 12i and 12h are adapted by electronics to convert a single ended port, for example, at bus 11a, to a differential port, for example, at bus 11i. Thus, the isolation circuit 12h provides for transparent communication between single ended SCSI bus 11a and differential SCSI bus 11i. The isolation circuits 12h and 12i are designed to be located either near a host 10a connected by single ended wires of bus 11a, but located relatively far from the peripherals 13, or, alternatively, connected near the peripherals 13 but located relatively far from the host 10a, and in both cases using a differential bus, for example, bus 11i, therebetween. In the preferred form, the maximum cable length of the single ended bus, for example bus 11a, is nineteen and one half feet, whereas the maximum differential bus length, for example, bus 11i, is eighty feet in length, the latter of which enabling the placement of isolation circuits 12c, 12d, 12e, 12f and 12g and the peripherals 13 a greater distance from the host computer 10a.

The system configurations of FIGS. 1a and 1b may vary greatly in terms of the length and the number of bus portions 11, the number of hosts 10 and the number of peripherals 13, as should now be apparent to those skilled in the art. For example, in yet another system configuration, not shown, an isolation circuit 12i located in a drive chassis, not shown, supporting a plurality of peripheral devices 13, connects to a single ended bus 11c so that the isolation circuit 12i is connected distal to a host computer 10 over differential bus 11i. In this configuration, the host 10 provides a differential pair port at bus 11i. This configuration is typically used for two host computers 10 connected by differential buses 11i to respective isolation circuits 12 both connected to all of the peripheral devices 13 over the single ended bus 11c.

Figure 2A:
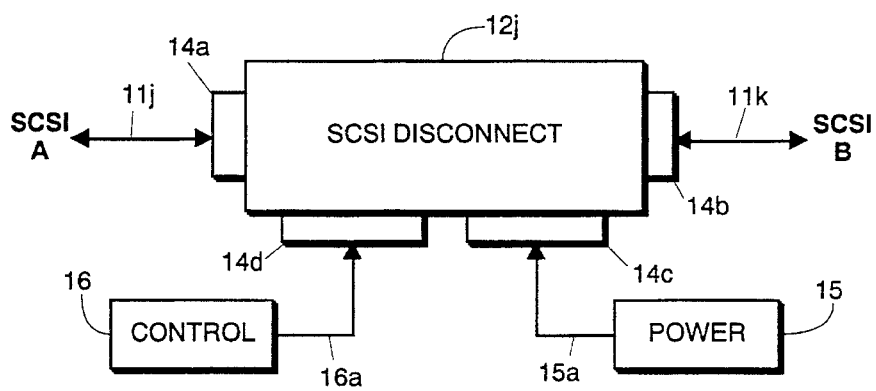
FIG. 2a is a block diagram of an in-line SCSI isolation disconnect apparatus.

Referring to FIG. 2a, an in-line isolation disconnect circuit 12j has two I/O connectors 14a and 14b, respectively used for communication over an A SCSI bus 11j and another B SCSI bus 11k. Power supply 15 supplies power to the circuit 12j through a power connector 14c and power lines 15a. Preferably, the buses 11j and 11k are SCSI bus portions and the connectors 14a and 14b are standard SCSI connectors. The function of the isolation circuit 12j is to either enable bus line drivers, not shown, within the isolation circuit 12j for transparent communication between bus portions 11j and 11k, or to disable the bus line drivers to functionally electrically isolate of the buses 11j and 11k from each other. Thus, the isolation circuit 12j provides an isolating disabling or communicating enabling function using line drivers which are preferably electrically line-by-line enabled or disabled to perfect proper bus communications. In one form of the invention, a switch, not shown, on the isolation circuit 12j is used to activate the disconnect isolation function which disables the bus line drivers. In another form of the invention, an external computer, not shown, for example a host computer, supplies a disconnect control signal on a designated external control line, not shown, to the isolation circuit 12j. In yet another form of the invention, as depicted in FIG. 2a, a control panel 16 has a three position switch, not shown, which is set to either connect, disconnect or auto connect having respective signals communicated to the isolation circuit 12j through a connect control connector 14d over control lines 16a. The connect function enables line drivers. The disconnect function disables the line drivers. The auto connect function selects the disconnect control signal from the external host computer for remote computer control of the disconnect isolation function.

Figure 2B:
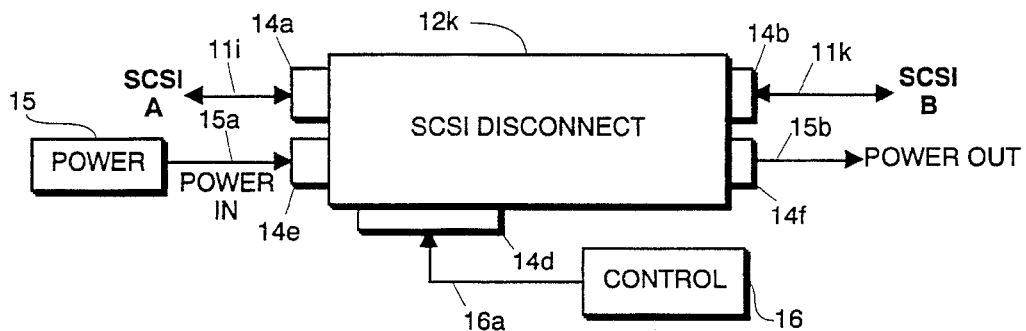
FIG. 2b is a block diagram of an in-line SCSI isolation disconnect apparatus with power input and output connections.

Referring to FIG. 2b, the in-line isolation circuit 12k may be housed in a circuit box, not shown, having the two standard SCSI connectors 14a and 14b, and two power connectors 14e and 14f, respectively for each bus 11j and 11k. The preferred SCSI interface signals of the buses 11j and 11k and respective power signal lines 15a and 15b are communicated through the isolation circuit 12k. Power from the power source 15 is routed through the circuit box to supply power to a connected device, for example, a disk drive, not shown, which may be connected to power lines 15b and the SCSI bus 11k. The communication signals on buses 11i and 11k are subject to the disconnect function. The power signals of power lines 15a and 15b would also preferably be subject to the disconnect function.

The isolation circuit 12k is an in-line transparent communication device on the SCSI bus 11. The SCSI isolation circuit 12k does not have a SCSI identification number for SCSI operation and would not generate SCSI interface responses on the bus 11. Therefore, the SCSI isolation circuit 12k does not use signals on the bus 11 to activate the disconnect function under control of or in operative association with another connected devices, such as a host 10, on bus 11. However, in an alternative form, the peripheral 13 or host 10 could be modified to generate a disconnect control signal, for example, on line 16a, connected to circuit 12k which would then cause the circuit 12k to isolate a connected device from the bus 11.

Figure 2C:
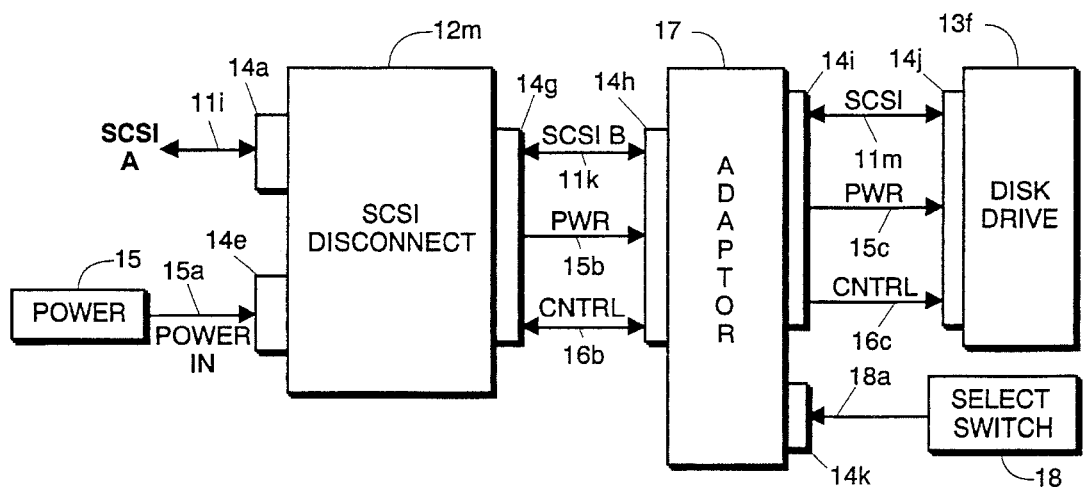
FIG. 2c is a block diagram of an in-line SCSI isolation disconnect apparatus connected to a disk drive module through an adaptor board.

Referring to FIG. 2c, the isolation circuit 12m is shown to connect to a peripheral 13f which is insertable and removable from a chassis, not shown. The isolation circuit 12m has a connector 14a for connecting to an A SCSI bus 11i and for communicating SCSI signals to a B SCSI bus 11k, and has a power connector 14e for receiving power from the power source 15 over power lines 15a for providing power signals on power lines 15b. The circuit 12m in shown to have a single connector 14g for communicating data on lines 11k, for communicating control signals on lines 16b and communicating power signals on power lines 15b though separate connectors may be used as well. Connect control signals on control lines 16b, as well as SCSI signals on lines 11k and power signals on power lines 15b are connected to an adaptor board 17 having a connector 14h connected to the same lines 11k, 15b and 16b. A removable disk drive 13f includes a standard connector 14j for insertion and removal into the chassis, and more particularly into a mating connector 14i on the adaptor board 17 connecting line SCSI lines 11m, power lines 15c and control lines 16c. The lines 11k, 15b, 16b, 11m, 15c and 16c are not cable lines, but conduction lines formed by virtue of contact between mating connectors 14i and 14j. The SCSI disconnect circuit 12m attaches to the drive 13f through a signal ribbon cables of lines 11k, 15b and 16b, though respective cable could be used as well as for the connection between the transition adaptor board 17 and the disconnect circuit 12m. For repetitive hot insertion and removal, the connectors 14i and 14j are preferably high 100,000 insertion count connectors, which may be three separate connectors, not shown, for respectively supporting communication lines 11k, power lines 15c and control lines 16c. Low 1000 insertion count connectors are preferably not used for repetitive disk drive removal applications even though the high 100,000 insertion count connectors 14i and 14j are more expensive but more reliable to enable a high number of insertions and removals of the drive 13f based upon expected applications. For daily insertions and removals, high insertion count connectors 14i and 14j are preferred. A host computer, not shown, can determine if a drive 13f is removed by attempting to access the drive 13f, and after a time out, designate the drive 13f as being off line, that is removed.

The drive chassis, not shown, has a plurality of drive sockets, not shown, for receiving respective disk drives 13f. There is a respective number of circuits 12m, adaptor boards 17 and remote select switches 18 for each socket. Each select switch 18 communicates a respective select signal over a respective line 18a through a respective connector 14k to a respective disconnect circuit 12m. The cable 18a connects between the connector 14k of the adaptor board 17 and the switch 18 positioned on a front panel, not shown, of the drive chassis, not shown, for communicating the select signal. In response to a select signal from the switch 18, the disconnect circuit 12m operates internal FETs, not shown, to supply power over power lines 15b and 15c to the drive 13f. A soft start circuit, not shown, of the isolation circuit 12m causes a linear ramp up of power during power turn on to prevent transients on chassis power lines, not shown, which run to all of the respective drives 13f, by turning on the power FET in a controlled manner. After providing power for a period of approximately 1.5 seconds, the disconnect circuit 12m then enables communication with the disk drive 13f over the SCSI lines 11i, 11k and 11m.

Each drive 13f is insertable into one of the plurality of chassis sockets, not shown, and is so then designated by a respective SCSI identification number. Each chassis socket is assigned a respective SCSI identification number. The control lines 16c which connect between the adaptor board 17 and the drive 13f, are used to communicate the SCSI identification number to the disk drive 13f to indicate its SCSI identification number so that the drive 13f can recognize its SCSI identification number communicated on the SCSI bus 11m. There are SCSI identification switches, not shown, on each of the disconnect circuits 12m which assign a selectable SCSI identification number for each chassis socket, and therefore, for each respective inserted disk drive 13f. When a drive 13f is inserted into a chassis socket, the drive 13f can sense its SCSI identification number through lines 16b and 16c. The identification number is communicated through the respective adaptor board 17, of a respective chassis socket and to the respective disk drive 13f.

An optical sensor, not shown, on the disconnect circuit 12m is used to determined when the disk drive 13f has been inserted into its respective chassis socket. The optical sensor detects the removal and insertion of the disk drive 13f to connect the SCSI bus 11i to the drive 13f. Upon deselection, power is removed from lines 15c to power down the respective disk drive 13f after the circuit 12m disconnects the respective drive 13f from the SCSI bus 11i. After disconnection and power down, the drive 13f may then be removed and another inserted while other devices, not shown, on bus 11i may continued to communicate with each other free from transients.

Referring to FIGS. 2a, 3a, 3b and 3c, the SCSI disconnect circuit, generally designate herein as 12, and particularly circuit 12j of FIG. 2a, is shown to include the SCSI A port connector 14a, the SCSI B port connector 14b, the power connector 14c and the control connector 14d. The SCSI connector 14a and 14b are standard SCSI connectors for communicating predetermined and specified SCSI data signals including signals DB0-7 (data bits 0–7) and DBP (Parity) and SCSI control signals ATN, (attention), BSY (busy), ACK (acknowledge), RST (reset), MSG (message), SEL (select), C-D (command data), REQ (request), I-O (input-output data direction), TERMPWR (terminator power) and GND (ground) for both the A SCSI port connector 14a and the B SCSI port connector 14b. These SCSI interface signals on connector 14a and 14b are bidirectional depending on the location of a device sourcing the signals. The connectors 14a and 14b have one no connection pin which is used for proper insertion orientation Of the connectors 14a and 14b.

The power connector 14c provides Vcc +5V DC and GND power signals. Power to circuit 12 is supplied through the connector 14c which has four pins including a +5Vcc pin, two ground pins and a fourth no-connection pin which is used for proper insertion orientation. The control connector 14d communicates Connect, Disconnect and Reset active low signals, designated with a appended slash indicating active low signals. A disconnect switch, not shown, on the control panel 16 connected by lines 16a to the connector 14d may be used to electrically generate the Connect, Disconnect or Reset signals to remotely activate connect, disconnect or reset operations of the circuit 12. The capacitors 20a, 20b, 20c and 20d are decoupling capacitors. Capacitors 20a and 20b may be 0.47 uf 25 V capacitors. Capacitor 20c may be a 0.01uf 25V capacitor. Capacitor 20d may be two parallel connected 22 uf capacitors.

Peripheral devices, not shown, typically include select LEDs which are recently being phased out of use. The disconnect circuit 12 preferably includes LED lamps 21 which indicate the status of the circuit 12. The LED 21a indicates that the A SCSI port is busy. The LED 21b indicates that the B SCSI port is busy. The LED 21c indicates that both ports of the SCSI bus are connected and enabled. The LED 21d indicates that the A SCSI port has termination power. The LED 21e indicates that the B SCSI port has termination power. The LEDs 21d and 21e also indicate that the SCSI cables are properly connected. The LEDs 21a and 21b respectively indicate that a device connected on one of the A or B ports is selecting or is busy indicating activity on the ports. When the SCSI disconnect circuit 12 has its own control panel 16, LEDs 21a and 21b may be positioned on the panel 16.

The disconnect circuit 12 has two SCSI interfaces having signal lines connected to connectors 14a and 14b and resistor terminators 22 and line NAND drivers 23, 24, 25 and 26. The switches 28 are designated 28a, 28b, 28c, 28d, 28e and 28f, as shown. SCSI signals TERMPWR for both the A and B SCSI interfaces are driven by the switches 28b and 28e. The SCSI signals are received using terminators 22 and driven by groups of NAND drivers 23, 24, 25 and 26 which are single ended but differential ended SCSI connections using differential drivers and receivers, not shown, would serve as well for longer length communication needs. The terminators 22 can be activated or deactivated by connecting or not connecting Vcc power to the terminators 22 using a disable input connected to switches 28a and 28f respectively. Terminator 22a terminates port A data bits, terminator 22b terminates port A control signals, terminator 22c terminates port B data bits and terminator 22d terminates port B control signals. The terminators 22a, 22b, 22c and 22d may preferably be DS2107S type terminators using voltage reference capacitors 29a, 29b, 29c and 29d, respectively, each of which may be a 4.7 uf electrolytic capacitor connected in parallel with a 0.1 uf ceramic capacitor.

The control of the circuit 12 may be by either the switches 28 or by remote control through the connector 14d, both of which may be used together. The remote control can be activated by operating remotely positioned switches, not shown, or through electrical connections, not shown, to a controller, not shown, such as a host computer. The connector 14d has four signals: the Connect active low signal which is to used to connect the SCSI buses of connector 14a and 14b, the ground signal return used for grounding, the Disconnect active low signal which is used to disconnect the SCSI buses of connector 14a and 14b, and the Reset signal which is used to reset the disconnect circuit 12. The circuit 12 has four pull up resistors 27a, 27b, 27c and 27d for terminating and pulling up the Connect and Disconnect signals and for terminating and pulling up APWRON and APWROFF signals. On board switches 28 are used to manually control and configure the operation of the disconnect circuit 12. The switches 28 are used to enable or disable on board termination for the SCSI buses, to auto connect or auto disconnect the SCSI buses upon the application of power, and to route terminator power from either the SCSI interface cables of connectors 14a and 14b or from the Vcc power source. When the Connect and Disconnect signals are inactive and the Reset signal is active, both ports of the SCSI bus will be disconnected. When the Reset signal becomes inactive, the SCSI buses will be auto connected if so configured by the switches 28. Terminator power signals (ATERMPWR and BTERMPWR) are used to turn on LEDs 21e and 21f to indicate that terminator power is provided to the terminators 22. ATERMPWR and BTERMPWR signals are provided through two respective fuses 30a and 30b in series and through two respective diodes 31a and 31b, and then through switches 28b and 28e, respectively, which then route terminator power to respective terminator pairs 22a and 22b, or 22c and 22d, respectively.

Inverters 32a and 32b are used to drive LEDs 21a and 21b, respectively, to indicate when the SCSI bus A and SCSI bus B are active. The enable busy out A (ENNASBBSYOUT) and B (ENABSBBSYOUT) signals drive LEDs 21a and 21b, respectively, to indicate which SCSI interface A or B, respectively, is asserting Busy or Select control signals communicated on the SCSI bus ports A or B. The enable power (ENABLEPWR) LED 21c is turned on when the SCSI bus ports are connected. The circuit 12 is adapted to control each set of line drivers 23, 24, 25 and 26 on both the SCSI bus ports on connector 14a and 14b. Each SCSI data and preferably each SCSI control signal may be connected or disconnected, that is enable or disabled, data bit-by-bit and control signal-by-signal, to perfect communication in either direction, that is, from the A SCSI bus on connector 14a to the B SCSI bus on connector 14b, or from the B SCSI bus on connector 14b to the A SCSI bus on connector 14a.

Preferably, each NAND gate driver of drivers 23, 24, 25 and 26 has an enable input for data bit-by-bit or control signal-by-signal enabled connection and disconnection.

The switches 28 are used to configure the circuit 12 to be connected or disconnected upon the application of power. The switches 28 includes six switches. The first switch 28a disables termination of B SCSI bus on connector 14b. The second switch 28b applies terminator power for the SCSI B bus on connector 14b by routing power from fuse 30b and diode 31b to the SCSI B terminator resistors 22c and 22d. The third switch 28c and the fourth switch 28d, when only one of which is set, either connects the Reset signal to auto-power-on (APWRON) or auto-power-off (APWROFF) signals for either connecting or disconnecting the A and B SCSI bus ports after the initial application of power. The fifth switch 28e applies terminator power for the SCSI A bus on connector 14a by routing power from fuse 30a and diode 31a to the SCSI A terminator resistors 22a and 22b. The sixth switch 28f disables termination of A SCSI bus on connector 14a. The power on Reset signal is routed through the switches 28c or 28d to drive either the auto-power-on (APWRON) signal or auto-power-off (APWROFF) signal, respectively. When power is applied, or when a power failure occurs and power is properly reapplied, the circuit 12 may be configured with both SCSI bus ports connected (APWRON) enabling a device to then communicate on the SCSI bus through the circuit 12. The terminator resistors 22 are used for pulling inactive signal line to an inactive high state with the signals being active low signals. Switches 28a and 28f can be set so that the terminators 22a and 22b, and 22c and 22d, respectively, can be activated or deactivated. Switches 28b and 28e can be set so as to apply or remove Vcc power to the terminators 22a and 22b, and 22c and 22d, respectively.

A hardwired initialization connect control sequence is shown by logic flow in FIG. 4a. The hardwired control sequence in embodied in circuit elements including the switches 28, AND gates 33a and 33b, flip-flop 34, reset timer 35 and NAND gate 36. The reset timer 35 provides a 200 ms pulse after Vcc power reaches 4.6 volts upon the application of power. After the 200 ms time period, the reset timer 35, which may be a DS1233Z device, terminates an active Reset signal. The Reset signal is connected to switches 28c and 28d to generate either the auto-power-on (APWRON) or auto-power-off (APWROFF) signals to either enable and connect the ports of the SCSI bus or disable and disconnect the ports of the SCSI bus. The auto-power-on and auto-power-off signals control the flip flop 34 which generates an Enable Power (ENABLEPWR) signal. The flip-flop 34 and reset timer 35 further drive NAND gate 36 to generate an Enable (ENABLE) signal. The Connect and Disconnect signals from the external three position switch, not shown, are also used to control the flip-flop 34 through AND gates 33a and 33b, respectively. The flip-flop 34 may be a 7474 device and is set if the Connect signal or the auto-power-on signal are active to generate the Enable Power signal. The flip-flop 34 is reset if the Disconnect or auto-power-off signals are active to not provide the Enable Power signal nor the Enable signal. Sequencer control of the circuit 12 begins when Enable Power signal is active and Reset signal is inactive so that the Enable signal becomes active.

The disconnect circuit 12 is a sequencer controlled circuit though other hardwired or microprocessor based circuits may be used equally as well. A master sequencer is shown by flow diagram in FIG. 4b. A control sequencer is shown by flow diagram in FIG. 4c. A data sequencer is shown by flow diagram in FIG. 4d.

The data sequencer is embodied in PALs 38a and 38b which are programmable array logic integrated circuits. SCSI bus data bits ASB0-7 and B SCSI bus data bits BSBD0-7 are received and buffered by buffer gates 39a and 39b and are provided on either the A bus or B bus by NAND drivers 23 and 24, respectively. The gates 39a and 39b may be 74ALS240 devices. The gates 39a and 39b provide internal data bits ASBIND0-7 and BSBIND0-7, respectively, to the inputs of the PALS 38a and 38b, respectively, and to the inputs of NAND drivers 23 and 24, respectively. The PALs 38a and 38b respectively provide bit-by-bit enable signals ENAADBOUT0-7 to enable A data bits 0–7 and provide data bit-by-bit enable signals ENABD-BOUT0-7 to enable B data bits 0–7. SCSI A bus data bits 0–7 and SCSI B bus data bits are provided through NAND drivers 23 and 24, respectively. The data bits are bidirectional as sourced by the NAND drivers 23 and 24 and as received by input gates 39, and are bit-by-bit enabled through outputs of the data PALs 38.

The master sequencer and a control sequencers are embodied in PALs 40a and 40b. Control signals SBDP (parity), SBACK (Acknowledge) and SBREQ (bus request) for both the A SCSI bus and the B SCSI bus are received and buffered by a gate 42 to provide SBINDP, SBINACK and SBINREQ buffered signals, respectively, for both the A and B SCSI bus ports. The gate 42 may be a 74ALS240 device. Control signals SBSEL (SCSI bus select), SBBSY (busy), SBATN (attention), SBMSG (message), SBI-O (I/O direction), and SBRST (reset) and SBC-D (command data), for both the A and B SCSI bus ports are latched by registers 44a and 44b which may be 74ALS534 devices. The registers 44 provide latched outputs SBINSEL, SBINBSY, SBINATN, SBINMSG, SBINI-O, SBINRST and SBINC-D which serve as clocked inputs to the PALs 40a and 40b.

An oscillator 46 has a Clock output signal which may be between twenty and sixty-four MHz and is routed through the buffer 42 and which drives the PALs 38a, 38b, 40a and 40b, and clocks buffer registers 44a and 44b. The Clock signal also drives an up counter 48 providing slower clocking signals to the sequencer 40a. The counter 48 has a clear input used to disable the clocking signals when the sequencer of PALs 38 and 40 has not yet been enabled during power on and reset. The PALs 40a and 40b provide control enable signals ENSBSELOUT (enable SCSI bus select out), ENSBBSYOUT (enable busy out), ENSBI-OOUT (enable I-O out), ENSBMSGOUT (enable message out), ENSBATNOUT (enable attention out), ENSBC-DOUT (enable command-data out) and ENSBRSTOUT (enable reset out). These output enable signals enable the NAND line driver 25 and 26 for providing enabled control signals onto the two SCSI bus ports. More than one NAND gate of ether set of NAND line drivers 25 and 26 may receive the same enabling signal, for example, the enable signal ENASBBSYOUT enables both the SBBSY and SBREQ outputs of respective NAND gates of the sets of NAND line drivers 25 and 26.

After the reset pulse, the ENABLE and ENABLEPWR signals enable operation of the data, master and control sequencer. These enable signals are routed as shown to the PALs 38 and 40 to enable the operation of the data, control and master sequencers. PAL 40a provides an ENAAOUT (enable A data bus out) signal and provide an ENABOUT (enable B data bus) signal to the data sequencer PALs 38 to control the direction of the data bits on the SCSI bus as provided by the NAND line drivers 23 and 24. All of the NAND gates 23, 24, 25 and 26 have open collector outputs. Buffered input signals of one port are routed to respective output signals on the other port. Each data NAND gate of NAND data line drivers 23 and 24 is enabled by a respective enabling signal from the PALs 38 and 40. The enable signals are used to control the directional flow of both the data and control signals between the A and B SCSI bus ports. In the preferred form of the invention, PALs 40 provide an ENA-SBBSYOUT (enable busy out) output enabling signal for both of the SCSI bus ports and is used to enable both the Busy output as well as the Request output. One enhancement of the preferred embodiment would be to have the PALs 40 provide a respective and separate enabling signal for each respective output control signal so that each and everyone of the control signal output line drivers of NAND line drivers 25 and 26 has a separate output enabling signal.

Figure 3A:
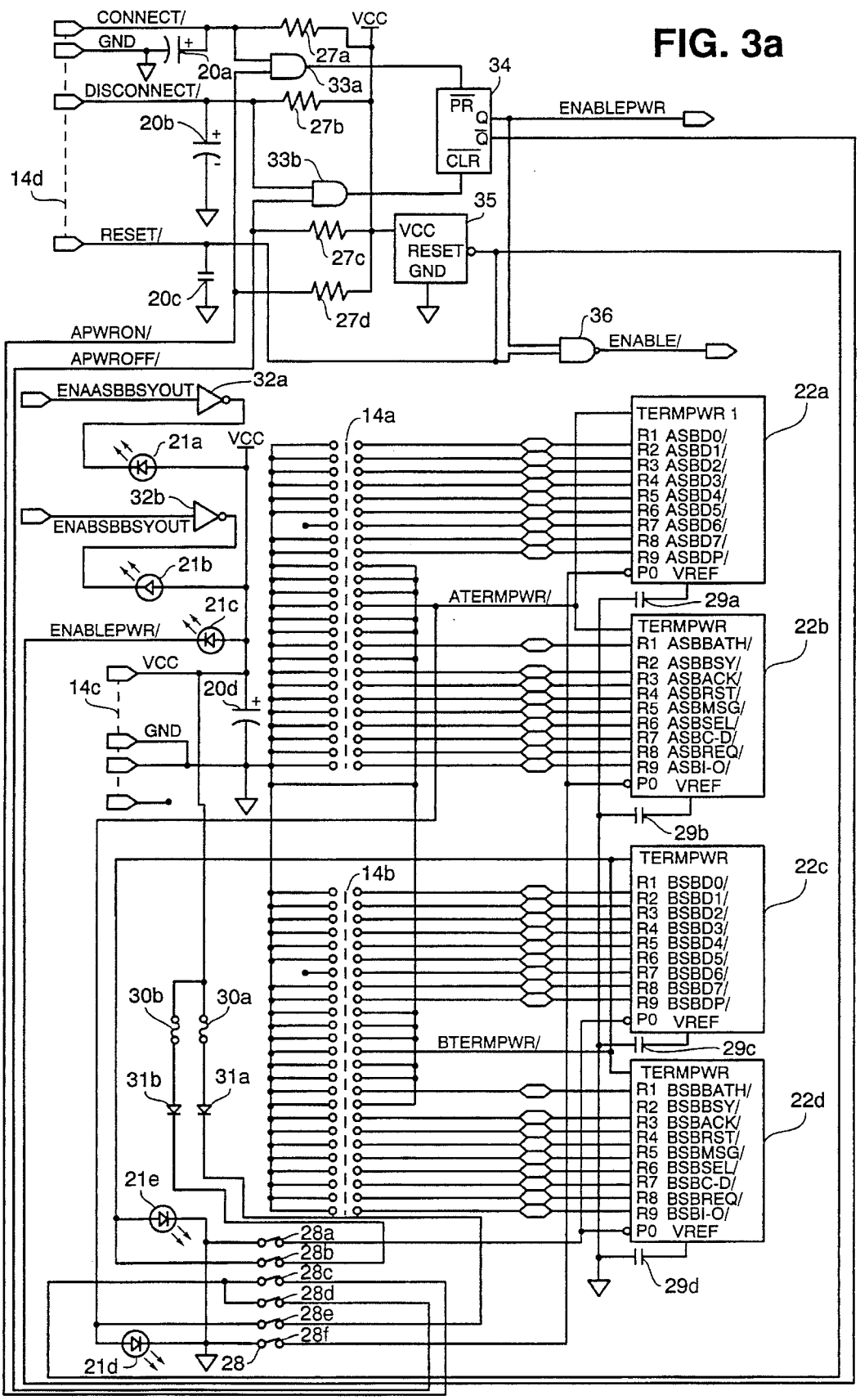
FIG. 3a is a schematic diagram of a portion of an in-line SCSI isolation circuit including SCSI bus terminators for two SCSI ports, power on reset, LEDs, logic connecting circuits and an auto connect switch.
Figure 3B:
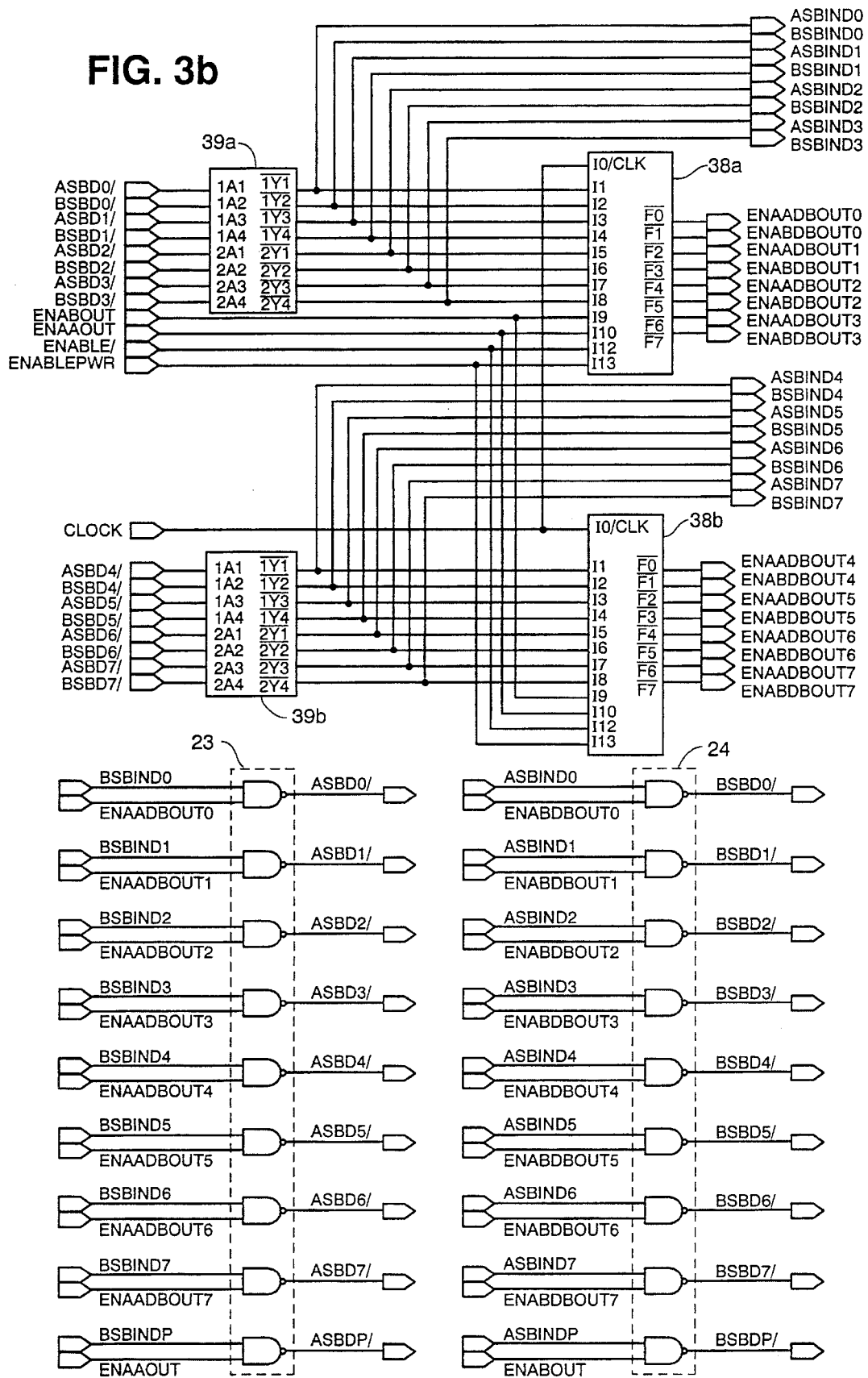
FIG. 3b is a schematic diagram of another portion of the in-line SCSI isolation circuit including single ended data signal line drivers and a data sequencer.
Figure 3C:
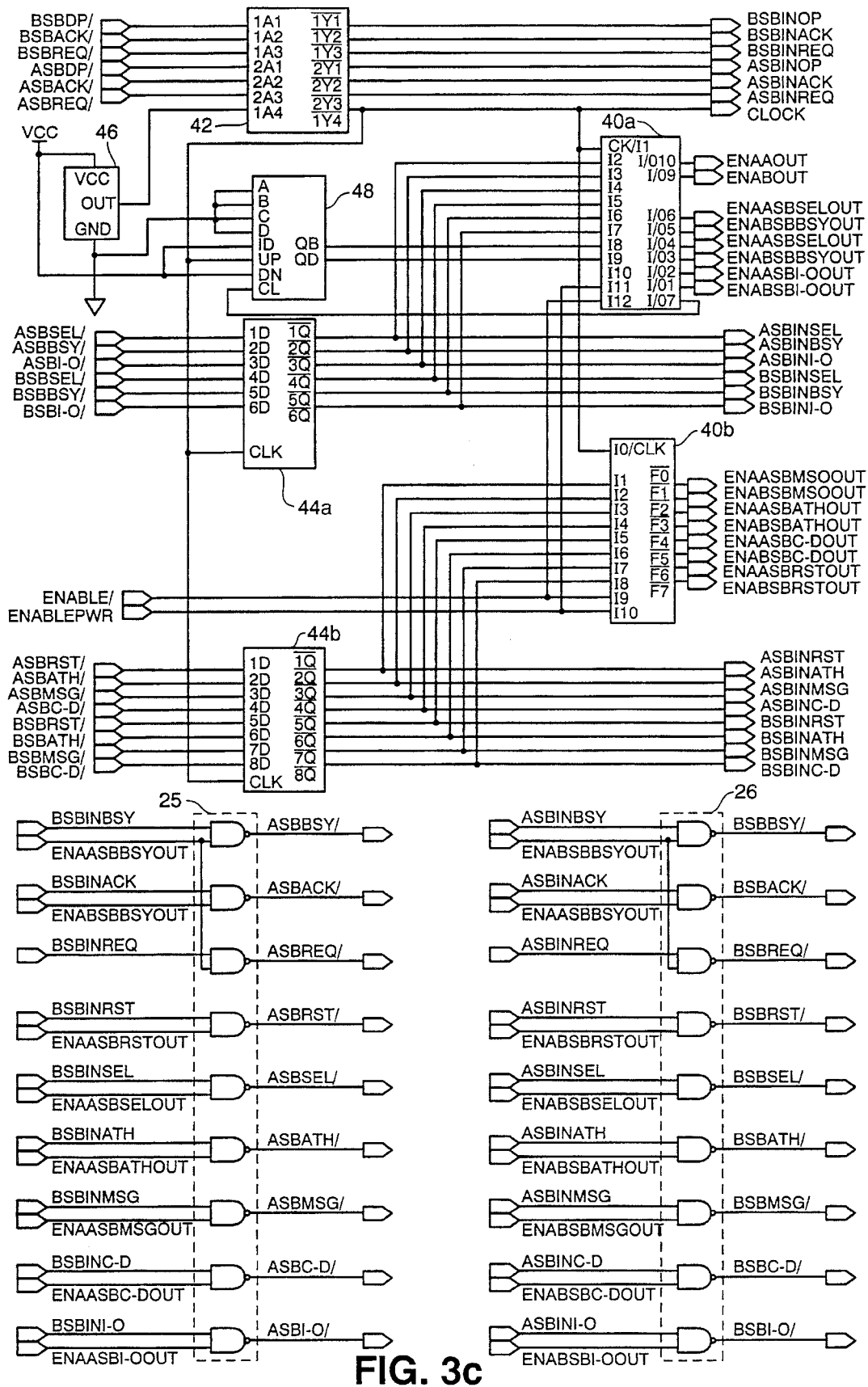
FIG. 3c is a schematic diagram of another portion of the in-line SCSI isolation circuit including single ended control signal line drivers, oscillator, clocking circuits, and a master and control sequencer.

Referring to FIGS. 2a, 3a, 3b, 3c, and particularly to FIG. 4a, the connect control sequence is perfected by hardwired circuits of FIG. 3a rather than by clocked sequences using PALs. The Connect Control Sequence is a logic sequence that starts with the application of power 90 and initiates 92 the 200 ms Reset signal by reset detect device 35. After expiration of the 200 ms reset signal period 92, auto connect on power up is determined 94 by the position of switches 28c and 28d which are set for either auto power on connect or auto power off disconnect. The switches 28d and 28c route the reset pulse on either APWROFF signal or APWRON signal, respectively, to clear or set the ENABLEPWR latch 34 for disconnecting 98 by line driver disablement, or for connecting 99 by line driver enablement.

The external Reset, Connect and Disconnect signals can be asserted from an external switch through the connector 14d. The loop 100, 102 and 104 is used to process these external switch signals. If the outputs were enabled 99, the external switch can provide a Reset signal 102 to then disable 109 the outputs during the active duration 92 of the external Reset signal to begin thereafter another auto power on connect determination 94. If the outputs were disabled 98 and the external switch provides 100 a Connect signal, then the outputs are enabled 99. If outputs were disabled 98 and no Connect signal is received, and if the external switch provides a Reset signal 102, then the outputs remain or become disabled 109. In the absence of an external reset signal 102, and the external switch provides 104 a disconnect signal, then the outputs are again disabled 98. Thus, the switches 28c and 28d, and the external switch Connect, Disconnect and Reset signals are used hardwired to enable-connect or disable-disconnect the SCSI bus, setting or clearing the latch 34 to provide the ENABLEPWR and ENABLE signals routed to the PALs 38 and 40 which provide the enabling signals to the line drivers 23, 24, 25 and 26.

Referring to the Master Sequencer of FIG. 4b, after power is applied and a power on connect 99 occurs to connect the SCSI bus, the master sequencer is initially in an initial inactive mode. The circuit 12 then monitors 110 for a select or busy condition and remains in the initial inactive mode while the Select or Busy signals are asserted. A select or busy condition means that the SCSI bus is active which is typically the normal data transfer mode. The flow remains monitoring 110 the Select and Busy signals as long as the Select or Busy is asserted. When there is no Select or Busy signal asserted, meaning that the bus is in a bus free state, an idle mode is enabled or remains enabled, and the normal mode is disabled if enabled, and a start bus free timer is initiated 120. The bus fee condition is timed by the master sequencer. The bus fee time is 800 ns. If the bus free timer had not expired 130, and if is select or busy is determined 135 to have been asserted, then bus free timer is checked again at 130 until its expiration. Once that bus free time has elapsed 130, without the reoccurrence of a select or busy condition 135, meaning that the bus is now free for a device to gain control of the SCSI bus for communication, the next phase of the SCSI bus will be an arbitration phase, and arbitration mode is enabled 140 and the idle mode is disabled. The arbitration mode is used by the connected SCSI devices to arbitrate for control of the SCSI bus to perfect desired communication using the select and busy signals during the normal mode. After the arbitration mode is enabled, the sequencer waits until either a select or busy signal is asserted 150 meaning that a device has control of the SCSI bus for desired communications, and the normal mode is set 160. If a Select or Busy signal was asserted 135 during the bus free timer time, then the normal is immediately enabled 160 and the master sequencer then again monitors 110 for the absence of the Select or Busy signal indicating the data communication in the normal mode has been discontinued.

Thus, the master sequencer is usually in either in the idle mode, the arbitration mode or the normal mode. The idle, arbitration, normal mode are enabled by the setting a respective indicator bit within the sequencer PALs 40. During the normal mode, data can be communicated bidirectionally between the A SCSI bus or the B SCSI bus. The data direction is determined by the I-O control signal, (ASBI-O or BSBI-O) on the SCSI bus, either from a connected initiator device or from a connected responding device. During the arbitration phase, data on the SCSI data lines can be communicated in either direction, the I-O signal is not then used to determine the direction of the data bits. For bus arbitration, each connected device on the SCSI bus has an address 0–7 with priority assigned to the lowest address. A device gains control of the bus over other connected devices during arbitration phase. During the arbitration phase, the individual data bits can be communicated in either direction from respective devices. The respective data bits may be communicated simultaneously in different directions during the arbitration phase. For example, during arbitration, an active signal data bit 0 on SCSI bus A port could be incoming while an active signal on data bit 1 on the SCSI bus B port could also be incoming, at the same time. The direction of each asserted arbitration data bit is dependent upon the placement of the in-line SCSI disconnect circuit relative to the devices within the system configuration. That is, during arbitration, data bit communication may be simultaneously bidirectional through the SCSI disconnect board dependent upon the placement of the connected devices on either SCSI bus A or B ports when the devices are seeking to gain control over bus by asserting a respective data bit 0–7, thereby subjecting the disconnect circuit 12 to data bit communication in simultaneous but differing directions. Data bit signal assertion during the arbitration phase is simultaneously bidirectional whereas data bit signal assertion during the normal mode is unidirectional and indicated by the I-O control line. After a device acquires control of the SCSI bus during arbitration, the normal mode is entered and only one device will communicate data bits at a time in one direction, and thus the data signal direction will be indicated by the I-O control signal and will be unidirectional through the circuit 12.

Referring to FIG. 4c, the control sequencer controls the direction of the control line signal flow through the circuit 12 by enabling or disabling the control lines using line drivers 25 and 26. Initially, all of the SCSI control signal are disabled 99. The control sequencer controls the direction through enablement and disablement of the NAND line drivers 25 or 26 for asserting the control signals which are bidirectional on either of the A or B SCSI bus ports. The control signals are enabled similar to the data bits during the arbitration mode, that is, the control signals may be asserted simultaneously and bidirectionally. After the SCSI bus ports are enabled 99, the control sequencer senses 170 the control signals on the SCSI bus A port. If a control signal is asserted 170, then the respective SCSI line driver for that control signal is enabled 190 on the B port and a respective line driver for that control signal is disabled 190 on the A port, to establish unidirectional communication of that control signal through the circuit 12. All of the SCSI bus A port signals are sensed 170. After sensing all of the SCSI bus A port control signals 170 and enabling 190 the asserted control signals on the A port and disabling respective control signals on the B port, the control sequencer then senses 180 SCSI bus B port control signals. If a SCSI bus B port control signal is asserted, then that SCSI bus B port control signal is enabled 200 on the A port and disabled 200 on the B port to establish communication through the circuit 12. After all the SCSI bus B port control signals are sense 180, then control signals on the A port are sensed 170 again. Control signals can only be asserted by one device at a time on the SCSI bus. Thus, if a control signal is asserted, it will be asserted on either A port or the B port of the SCSI bus, but not both ports. The enabling and disabling of the control signals perfects proper unidirectional communication through the circuit 12 and is similar to the enabling and disabling of asserted data bits during arbitration phase during which only device can assert a particular address data bit. The control sequencer is not mode dependent, and always function to transfer the control signals through the disconnect circuit 12 on a control signal-by-signal basis.

Referring to the Data sequencer of FIG. 4d, after a power on connect 99, a determination 210 is made if the sequencer in is the idle mode. If not, a determination is made 215 if the sequencer is in the normal mode. If not, then it is preferably assumed or may be determined that the sequencer is in the arbitration mode during which data bits may be simultaneously communicated bidirectionally. Initially, upon power on enable 99, all of the A bus port and B bus port data bits are disabled. Both the data bits on the A SCSI bus port are checked 220 and data bits on the B SCSI bus port are checked 230 during the arbitration mode. If data bits are asserted 220 on the SCSI bus A port, then those bits are enabled 250 onto the B port and disabled onto the A port. If data bits are asserted 230 on the SCSI bus B port, then those bits are enabled 260 onto the A port and disabled onto the B port. The enabling 250 of bits on B port and disabling 250 respective bits on the A port sets the communication direction from the A bus to the B bus through the circuit 12. The enabling 260 of bits on A port and disabling 250 respective bits on the B port sets the communication direction from the B port to the A port through the circuit 12. Thus, the enabling of data bits on one bus and the disabling of respective data bits on the other bus sets the direction of the data bit communication. In this manner, the circuit 12 functions to control the direction of active SCSI data bits during arbitration similar to controlling the direction of active SCSI control signals through the circuit 12. The data sequencer senses 220 and 230 for incoming active data bits by sensing for an active low data bit signal. The communication direction for each data bit is independent of the other data bits during the arbitration mode 220, 230, 240, 250 and 260.

The device address priority is based upon the lowest data bit address from zero to address seven. The device asserting the highest priority during the arbitration phase wins the arbitration and take controls of the bus. When a device wins the arbitration, it asserts Busy on the bus to indicated that the bus is no longer free. The data sequencer determines 240 when the arbitration mode 240 has terminated to disable 270 the data bits on the A and B bus ports at the time that the master sequence enables the normal mode 160 all the while the control bits are still enabled through the disconnect circuit 12.

After arbitration and during the normal mode, the controlling device asserts Selects and drops Busy to indicate that the controlling device will be selecting another device with which it seeks to communicate. After asserting Select, the controlling initiating device asserts the identification address of the responding device which asserts Busy after recognizing its identification address on the SCSI bus. After the responding device asserts Busy, the initiating device drops Select after which the devices enter into the message, command and data phases to transfer data in the normal mode. After all the data has been transferred, the responding device drops Busy, and then the SCSI bus enters the bus free condition as the master sequencer enables 120 the idle mode.

During normal mode operation, when all of the data bits are transferred simultaneously in one direction at a time, the I-O control signal indicates the direction of the data bit flow on the bus, but not the direction of the control signals. The control sequencer independently controls the flow of control signals through the disconnect circuit 12. The data sequencer determines 215 when the circuit 12 is in the normal mode and if so determines 280 the direction of the data bit flow. The data bits are initially disabled prior to determining 280 the direction of the data bits. The data sequencer senses 280 the I-O control signal line to determine the data bit flow direction. The data sequencer then enables 290 line drivers 23 for A port to B port SCSI bus communication or enables 300 line drivers 24 for B port to A port SCSI bus data communication. The data sequencer determines 320 if the normal mode is still enabled and if so senses again the I-O control line at 280. The I-O control line is again sensed 280 to determined if the communication direction has changed to appropriately enable 290 A port to B port SCSI bus data communication or to enable 300 B port to A port SCSI bus communication. If the normal mode has been disabled 120 or 140, then the data bit outputs of data line drivers 23 and 24 are disabled 270, and data sequencer then jumps to the idle mode determination 210. Thus, data sequencers enables bit-by-bit simultaneous bidirectional data bit communication during the arbitration phase, and byte wide unidirectional communication during the normal phase which direction may change depending on the state of the I-O control signal.

The circuit 12 in an in-line SCSI bus device necessarily having at least two ports, though more than two ports could be used with additional respective line drivers. The circuit 12 drives the SCSI bus lines on both ports using dedicated line drivers all of which are enabled or disabled to perfect proper bidirectional communications. Means are provided to disable all the line drivers on the ports so that a device connected to one port does not couple transients voltage signals to the other port during device removal and insertion, thereby completely preventing transient voltage signals from communicating through the circuit 12 during the removal or insertion of that device on one port to the other devices connected to the other port. While the above preferred embodiment has been applied to the SCSI bus, other modifications to the circuit 12 can provide for isolation to other conventional data buses. When using other bus specification, multiple control signals line drivers or multiple data bit line drivers may be enabled by a single enabling signal from the PALs 40s. The above preferred embodiment made be enhanced and modified, but those enhancements and modifications may nonetheless fall within the spirit and scope of the following claims.

What is claimed is:

1. A system for communicating data bidirectionally over a data bus within a data bus specification and for isolating said bus, said system comprising, a first means for communicating said data, a second means for communicating said data, bus means having a first portion connected to said first means and a second portion connected to said second means, both of said portions of said bus means for bidirectional transparent communication of said data between said first means for communicating said data and said second means for communicating said data within said data bus specification, and an isolation means connected in-line between said first and second portions of said bus means for isolating said first and second portions of said bus means from each other and for communicating said data between said first and second portions of said bus means, said isolation means comprising first set of line drivers connected to said first portion of said bus means, comprising second set of line drivers connected to said second portion of said bus means, and comprising a control means physically disposed in-line between said first and second portions of said bus means for disabling said first and second sets of line drivers for isolation of said first and second portions of said bus means from each other, said control means also for sensing said bus means and determining direction of said bidirectional transparent communication of said data and for then enabling at least a portion of said first set of line drivers and disabling at least a respective portion of said second set of line drivers and by disabling at least another portion of said first set of line drivers and enabling at least another respective portion of said second set of line drivers so as to enable said bidirectional transparent bus communication through first and second sets of line drivers.

2. The system of claim 1 wherein said bus means is a data bus communicating said data including data signals and control signals, said first means for communicating said data is a computer, said second means for communicating said data is a peripheral, and said first and second sets of line drivers each having at least a first set of data line drivers for communicating said data signals and a second set of control line drivers for communicating said control signals, each data line driver of said first and second sets of data line drivers has an enabling input to selectively enable or disable said each data line driver, at least two control line drivers of each of said first and second sets of control line drivers have an enabling input to selectively enable or disable respective control line drivers of said first and second sets of control line drivers.

3. The system of claim 1 further comprising a control panel having a means for communicating to said isolation means a disconnect signal commanding said isolation means to isolate said first means for communicating said data from said second means for communicating said data by disabling said first and second sets of line drivers.

4. The system of claim 1 wherein said isolation means has at least a first set of buffers connected to said first portion of said bus means for receiving said data from said first means for communicating said data, and connected to said second set of line drivers for communicating said data to said second means for communicating said data through said second set of line drivers, and said isolation means has at least a second set of buffers connected to said second portion of said bus means for receiving said data from said second means for communicating data, and connected to said first set of line drivers for communicating said data to said first means for communicating said data through said first set of line drivers.

5. The system of claim 1 wherein said first set of line drivers are single ended line drivers and said second set of line drivers are differential line drivers.

6. An in-line isolation circuit for isolating a first device connected on a first portion of a data bus from a second device connected on a second portion of said data bus, said in-line isolation circuit also for bidirectional transparent communication of said data between said first and second devices through said data bus, said in-line isolation circuit comprising a first set of line drivers connected to said first portion of said data bus for communicating said data to said first device, a second set of line drivers connected to a second portion of said data bus for communicating said data to said second device, and a control means physically disposed in-line between said first and second portions of said data bus for disabling said first and second sets of line drivers for isolation of said first and second portions of said data bus from each other, said control means also for sensing said data bus and determining direction of said bidirectional transparent communication of said data and for then enabling at least a portion of said first set of line drivers and disabling at least a respective portion of said second set of line drivers and by disabling at least another portion of said first set of line drivers and enabling at least another respective portion of said second set of line drivers so as to enable said bidirectional transparent bus communication through first and second sets of line drivers.

7. The circuit of claim 6 wherein said data bus communicates said data including data signals and control signals, said first set of line drivers has a first set of data line drivers for communicating said data signals and a first set of control line drivers for communicating said control signals, and said second set of line drivers has a second set of data line drivers for communicating said data signals and a second set of control line drivers for communicating said control signals, each data line drivers of said first and second sets of data line drivers has an enabling input to selectively enable or disable each data line driver of said first and second set of data line drivers, and, at least two control line drivers of each of said first and second sets of control line drivers have an enabling input to selectively enable or disable said at least two control line drivers of each of said first and second sets of control line drivers.

8. The circuit of claim 6 wherein said circuit further comprises a set of single ended receivers connected to said first portion of said data bus for receiving said data from said first device, said first set of line drivers are single ended line drivers for communicating said data to said first device through said first portion of said data bus, said set of single ended receivers and said first set of line drivers provide said transparent bidirectional communication on said first portion of said data bus, and a set of differential receivers connected to said second portion of said data bus for receiving said data from said second device, said second set of line drivers are differential line drivers for communicating said data to said second device through said second portion of said data bus, said set of differential receivers and said second set of line drivers provide said transparent bidirectional communication on said second portion of said data bus.

9. The circuit of claim 6 wherein said circuit further comprises, reset means connected to said control means, said reset means for providing a reset signal provided for a duration of time, said control means for receiving said reset signal and adapted to disable said first and second sets of line drivers during the presence of said reset signal.

10. The circuit of claim 6 wherein said data bus communicates said data including data signals and control signals, said first set of line drivers has a first set of data line drivers for communicating said data signals and a first set of control line drivers for communicating said control signals, said second set of line drivers has a second set of data line drivers for communicating said data signals and a second set of control line drivers for communicating said control signals, each data line driver of said first and second sets of data line drivers has an enabling input to selectively enable or disable each data line driver of said first and second sets of data line drivers, and, at least two control line drivers of each of said first and second sets of control line drivers have an enabling input to selectively enable or disable said at least two control line drivers of each of said first and second sets of control line drivers, said in-line isolation circuit further comprises, a first set of receivers connected to said first portion of said data bus for receiving said data signals and said control signals from said first device, said first set of data line drivers and said first set of control line drivers communicate said data signals and said control signals to said first device through said first portion of said data bus, said first set of receivers and said first set of line drivers provide said transparent bidirectional communication on said first portion of said data bus, said first set of receivers communicate said data signals and said control signals respectively to said second sets of data line drivers and said second set of control line drivers, said first set of receivers communicate said data signals and said control signals to said control means, said control means senses said data signals and said control signals and provides enabling and disabling signals to said second sets of line drivers, and a second set of receivers connected to said second portion of said data bus for receiving said data signals and said control signals from said second device, said second set of data line drivers and said second set of control line drivers communicate said data signals and said control signals to said second device through said second portion of said data bus, said second set of receivers and said second set of line drivers provide said transparent bidirectional communication on said second portion of said data bus, said second set of receivers communicate said data signals and said control signals respectively to said first set of data line and said first set of control line drivers, said second set of receivers communicates said data signals respectively to said first set of data line drivers and said first set of control line drivers, said second set of receivers communicates said data signals and said control signals to said control means, said control means senses said data signals and said control signals and provides enabling and disabling signals to said first sets of line drivers.

11. A method of isolating a first device from a second device connected together through a data bus bidirectionally communicating data signals and control signals, said data bus separated into a first portion and a second portion by an in-line isolation circuit having a first port connected to said first portion of said data bus connected to said first device and a second port connected to said second portion of said data bus connected to said second device, said in-line isolation circuit having a first set of data line drivers and a first set of control line drivers for said first port and having a second set of data line drivers and a second set of control line drivers for said second port, said in-line isolation circuit having a control means physically disposed in-line between said first and second portions of said data bus to disable for isolation and enable for transparent bidirectional communication both first and second sets of said data line drivers and said control line drivers, each data line driver of said first and second sets of data line drivers are selectively enabled and disabled, at least two control line drivers of each of said first and second sets of control line drivers are selectively enabled and disabled, communication through said data bus is provided by enabling line drivers of said first set of line drivers and disabling respective line drivers of said second sets of data line drivers and by enabling line drivers said second set line drivers and disabling respective line drivers of said first set of line drivers, said method comprising the steps of, data disabling said first and second sets of data line drivers, control disabling said first and second sets of control line drivers, the disabling of said first and second sets of data line drivers and said first and second sets of control line drivers electrically isolating said first and second devices from each other through said data bus, sensing said data signals and said control signals for determining direction of said bidirectional transparent communication, data enabling by enabling at least one of said first set of data line drivers and disabling a respective one of said second set of data line drivers for one communication direction or by enabling at least one of said second set of data line drivers and disabling a respective one of said first set of data line drivers for another communication direction to enable the communication of a respective at least one data signal of said data signals between said first and second devices, and control enabling by enabling at least one of said first set of control line drivers and disabling a respective one of said second set of control line drivers for one communication direction or by enabling at least one of said second set of control line drivers and disabling a respective one of said first set of control line drivers for another communication direction to enable communication of a respective at least one control signal of said control signals between said first and second devices.

12. The method of claim 11 further comprising the steps of sensing said first port for asserted control signals, said control enabling step for respectively enabling said control line drivers of said second set of control line drivers for respectively asserted control signals on said first port, said control disabling step also for respectively disabling said control line drivers of said second set of control line drivers for respectively unasserted control signals on said first port, and sensing said second port for asserted control signals, said control enabling step for respectively enabling said control line drivers of said first set of control line drivers for respectively asserted control signals on said second port, and said disabling step also for respectively disabling said control line drivers of said first set of control line drivers for respectively unasserted control signals on said second port.

13. The method of claim 11 further comprising the steps of sensing said first port for asserted data bits signals, said data enabling step for respectively enabling said data line drivers of said second set of data line drivers for respectively asserted data bit signals on said first port, said data disabling step also for respectively disabling data line drivers of said second set of data line drivers for respectively unasserted data bit signals on said first port, and sensing said second port for asserted data bit signals, said enabling step for respectively enabling data line drivers of said first set of data line drivers for respectively asserted data bit signals on said second port, said data disabling step also for respectively disabling data line drivers of said first set of data line drivers for respectively unasserted data bit signals on said second port.

14. The method of claim 11 further comprising the step of sensing an I-O control line of said control signals for each of said first port and said second port, said I-O control line having a first state and a second state, said data enabling step for enabling said first set said data line drivers and said data disabling step for disabling said second set of data line drivers when said I-O control line is in said first state, said data enabling step for enabling said second set said data line drivers and said disabling step for disabling said first set of data line drivers when said I-O control line is in said second state.

15. The method of claim 11 wherein said data disabling step disables said first and second set of data line drivers and wherein said control disabling step disables said first and second set of control line drivers a predetermined amount of time after an application of power to said in-line isolation circuit.

16. The method of claim 15 wherein said in-line isolation circuit has at least an auto connect state or an auto disconnect state, said method further comprising the steps of determining if said in-line isolation circuit is in said auto connect state or in said auto disconnect state, continuing said data disabling step and said control disabling step an indefinite period of time if said in-line isolation circuit is in said auto disconnect state, and discontinuing said data disabling step and said control disabling step if said in-line isolation circuit is in said auto connect state.

17. The method of claim 11 wherein said in-line isolation circuit is connected to an external means providing an external connect signal, said method further comprising the steps of determining the presence of said external connect signal, and executing said enabling steps in the presence of said external connect signal.

18. The method of claim 11 wherein said in-line isolation circuit is connected to an external means providing an external disconnect signal, said method further comprising the steps of determining the presence of said external disconnect signal, and executing said data disabling and said control disabling steps in the presence of said disconnect signal.

* * * * *